US008732818B2

(12) United States Patent
Buch et al.

(10) Patent No.: US 8,732,818 B2
(45) Date of Patent: *May 20, 2014

(54) END-TO-END AUTHENTICATION OF SESSION INITIATION PROTOCOL MESSAGES USING CERTIFICATES

(71) Applicant: Microsoft Corporation, Redmond, WA (US)

(72) Inventors: Jeremy T. Buch, Redmond, WA (US); David J. Simons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/631,737

(22) Filed: Sep. 28, 2012

(65) Prior Publication Data
US 2013/0036308 A1    Feb. 7, 2013

Related U.S. Application Data

(63) Continuation of application No. 11/750,306, filed on May 17, 2007, now Pat. No. 8,307,421, which is a continuation of application No. 10/151,575, filed on May 17, 2002, now Pat. No. 7,240,366.

(51) Int. Cl.
*H04L 29/06* (2006.01)

(52) U.S. Cl.
USPC ............ 726/14; 726/11; 726/12; 726/15; 726/16; 713/156; 713/157; 713/158

(58) Field of Classification Search
USPC ................................................... 726/14
See application file for complete search history.

(56) References Cited

U.S. PATENT DOCUMENTS

| 6,173,173 | B1* | 1/2001 | Dean et al. ............ 455/410 |
| 6,353,891 | B1 | 3/2002 | Borella et al. |
| 6,865,681 | B2 | 3/2005 | Nuutinen |
| 6,870,848 | B1 | 3/2005 | Prokop |
| 7,240,366 | B2 | 7/2007 | Buch et al. |
| 7,243,370 | B2 | 7/2007 | Bobde et al. |
| 7,770,007 | B2 | 8/2010 | Bobde et al. |
| 2002/0029200 | A1 | 3/2002 | Dulin et al. |
| 2002/0078153 | A1 | 6/2002 | Chung et al. |
| 2002/0120760 | A1 | 8/2002 | Kimchi et al. |
| 2002/0141358 | A1 | 10/2002 | Requena |
| 2002/0150226 | A1 | 10/2002 | Gallant et al. |

(Continued)

OTHER PUBLICATIONS

U.S. Appl. No. 60/276,923, filed Mar. 20, 2001, Gallant.

(Continued)

*Primary Examiner* — Longbit Chai
(74) *Attorney, Agent, or Firm* — Perkins Coie LLP

(57) ABSTRACT

End-to-end authentication capability based on public-key certificates is combined with the Session Initiation Protocol (SIP) to allow a SIP node that receives a SIP request message to authenticate the sender of request. The SIP request message is sent with a digital signature generated with a private key of the sender and may include a certificate of the sender. The SIP request message my also be encrypted with a public key of the recipient. After receiving the SIP request, the receiving SIP node obtains a certificate of the sender and authenticates the sender based on the digital signature. The digital signature may be included in an Authorization header of the SIP request, or in a multipart message body constructed according to the S/MIME standard.

20 Claims, 8 Drawing Sheets

(56) References Cited

U.S. PATENT DOCUMENTS

| | | | |
|---|---|---|---|
| 2002/0157019 A1 | 10/2002 | Kadyk et al. | |
| 2003/0009463 A1 | 1/2003 | Gallant | |
| 2003/0012382 A1 | 1/2003 | Ferchichi et al. | |
| 2003/0081791 A1* | 5/2003 | Erickson et al. | 380/282 |
| 2003/0217164 A1 | 11/2003 | Cai et al. | |
| 2004/0103157 A1 | 5/2004 | Requena et al. | |
| 2008/0046745 A1 | 2/2008 | Buch et al. | |

OTHER PUBLICATIONS

"UMTS AKA in SIP,"Nokia, 3GPP TSG SA WG3 Security—S3#14, Oslo, Norway, Aug. 4, 2000, 3 pages.

Rosenberg et al. "draft-ietf-sip-rfc2543bis-09.txt—SIP: Session Initiation Protocol," Feb. 27, 2002, Section 23: S/MIME, Complete document at http://www.potaroo.net/ietf/idref/draft-ietf-sip-rfc2543bis/.

IETF, "RFC 2543—SIP: Session Initiation Protocol," Mar. 1999.

"Re: Kerberos Authentication and Authentication (proxy ticket forwarding)," Apache Development Mailing List, Nov. 6, 1999, ronald@innovation.ch, http://hypermail.linklord.com/new-httpd.old/1999/Nov/0106.html, 2 pages.

La Tour, Irenee Dupre, "A Secure Authentication Infrastructure for Mobile Communication Services over the Internet," Mar. 2001, PhD Thesis, University of Ottawa, Chapters 7-9, Complete document at http://beethoven.site.uottawa.ca/dsrg/PublicDocuments/.

"How PGP works," Chapter 1 of Introduction to Cryptography in the PGP 6.5.1 documentation, copyright 1999 Network Associates, http://www.pgpi.org/doc/pgpintro/, 23 pages [last accessed Nov. 18, 2005.

Byerly, Bryan J. and David Williams, "SIP Authentication Using CHAP-Password," Internet Engineering Task Force, Internet Draft, Oct. 2000, 12 pages.

"Kerberos on the Web: Protocol Example," http://www.monkey.org/_dugsong/krb-www/kapache/KRB_PROT.HTM, [last accessed Feb. 14, 2006].

Network Associates, "How PGP works," 1999, http://www.pgpi.org/doc/pgpintro/.

\* cited by examiner

END-TO-END AUTHENTICATION OF SESSION INITIATION PROTOCOL MESSAGES USING CERTIFICATES

CROSS-REFERENCE TO RELATED APPLICATIONS

This application is a continuation of U.S. patent application Ser. No. 11/750,306, filed May 17, 2007, which is a continuation of U.S. patent application Ser. No. 10/151,575, filed May 17, 2002, both of which are incorporated herein by reference in their entirety.

TECHNICAL FIELD

This invention relates generally to communications between devices over a computer network, and more particularly to the integration of an end-to-end authentication mechanism into network communications using the Session Initiation Protocol (SIP) to enable end-to-end authentication of SIP messages.

BACKGROUND OF THE INVENTION

The Session Initiation Protocol (SIP) is a signaling protocol that provides a mechanism for a computing device to locate another device it wants to communicate with over a computer network and to establish a communication session therewith. In this context, the first device is typically referred to as the "caller," the second device as the "callee," and both are "SIP clients." SIP is a versatile protocol and has been used for establishing communication sessions in many different scenarios. For instance, SIP is used for Internet conferencing, telephony, presence, event notification, and instant messaging. An important strength of SIP is its support of personal mobility by providing the ability to reach a called party (user) under a single location-independent address even when the called party has moved to a different computer.

One common mode of session initiation operation under the SIP is the "proxy mode." In this mode, the caller sends an INVITE message identifying the intended callee by an e-mail like address. This INVITE message is typically first sent to an outbound SIP proxy of the caller SIP client. The outbound SIP proxy then forwards the INVITE message, often through other intermediate SIP proxies, to a SIP proxy with which the callee has registered, which then sends the INVITE to the callee. The acceptance message ("200 OK") of the callee is returned through the signaling chain to the caller, which can then communicate with the callee through a media channel that is typically different from the signaling channel. Because of the important role of the SIP proxies in the session initiation operations, several client-server authentication mechanisms have been proposed for use with SIP for authentication between SIP clients and SIP proxies.

One existing problem with SIP is that it has a two-tier routing system that requires both a Directory Naming Service (DNS) and a registration database to provide routing information. This two-tier system makes it difficult for the end users to authenticate each other. Traditional authentication schemes proposed for use with SIP for client-server authentication do not effectively address this problem. For instance, the DIGEST and NTLM mechanisms require the use of user passwords, which is not suitable for user-to-user authentication. The Kerboros scheme, another proposed client-server authentication mechanism for SIP, typically employs domain-based ticket-granting agents and is difficult to deploy in cross-domain communications. Currently, there is no provision for a way that uses standard-based technology to allow authentication between end users that communicate under the SIP protocol.

SUMMARY OF THE INVENTION

In view of the foregoing, the present invention provides a way for SIP parties to perform end-to-end user authentication by integrating the use of public-key certificates with SIP request messages. When a SIP node sends out a SIP request message, it includes in the request message a digital signature generated using a private key of the user of the sending SIP node and optionally a certificate for the public key associated with that private key. The SIP message may also be encrypted using the public key of the intended recipient of the SIP request message. When the SIP node, which may be an end client or an intermediate SIP server, of the intended recipient receives the SIP request message, it uses the digital signature and the sender's certificate, which may be obtained from another source or retrieved from the SIP message if it includes one, to authenticate the sender and at the same time confirms the integrity of the message.

One scheme in accordance with the invention for including the digital signature in the SIP message is to create a header, such as a new Authorization (for an end client) or Proxy Authorization header (for an intermediate SIP server), in the SIP message for carrying the signature and optionally the certificate. An alternative scheme in accordance with the invention for carrying a digital signature in the SIP request is to include the signature and optionally the certificate and encrypted data in the multipart message body of the SIP request message, preferably formatted according to the Secure/Multipurpose Internet Mail Extensions (S/MIME) standard.

The sending SIP client may send the SIP request message containing the signature after receiving a challenge from the receiving SIP node in response to an initial unsigned SIP request sent by the sending SIP node. Alternatively, the sending client may include the digital signature in an initial SIP request message directly without waiting to be challenged.

While the appended claims set forth the features of the present invention with particularity, the invention, together with its objects and advantages, may be best understood from the following detailed description taken in conjunction with the accompanying drawings.

DETAIL DESCRIPTION OF THE INVENTION

Figure 1:
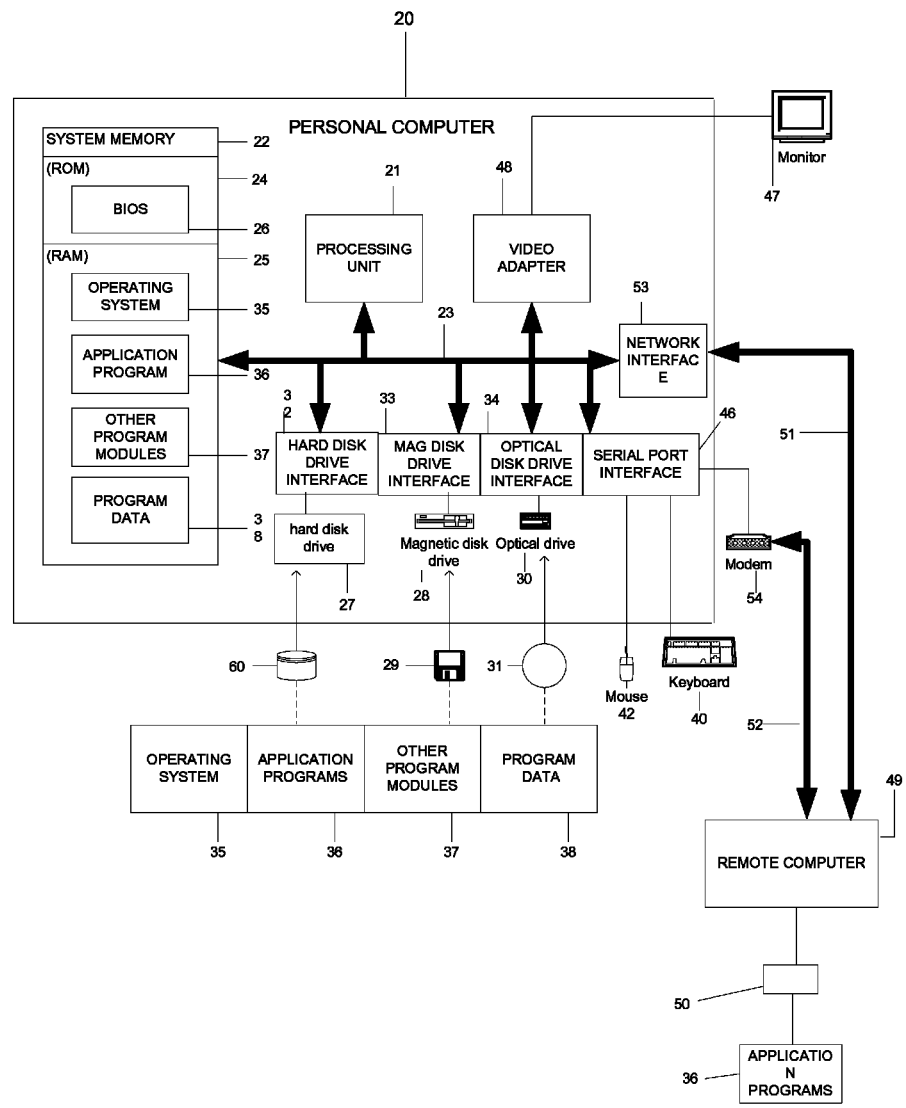
FIG. 1 is a block diagram generally illustrating an exemplary computer system on which the present invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2-7. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
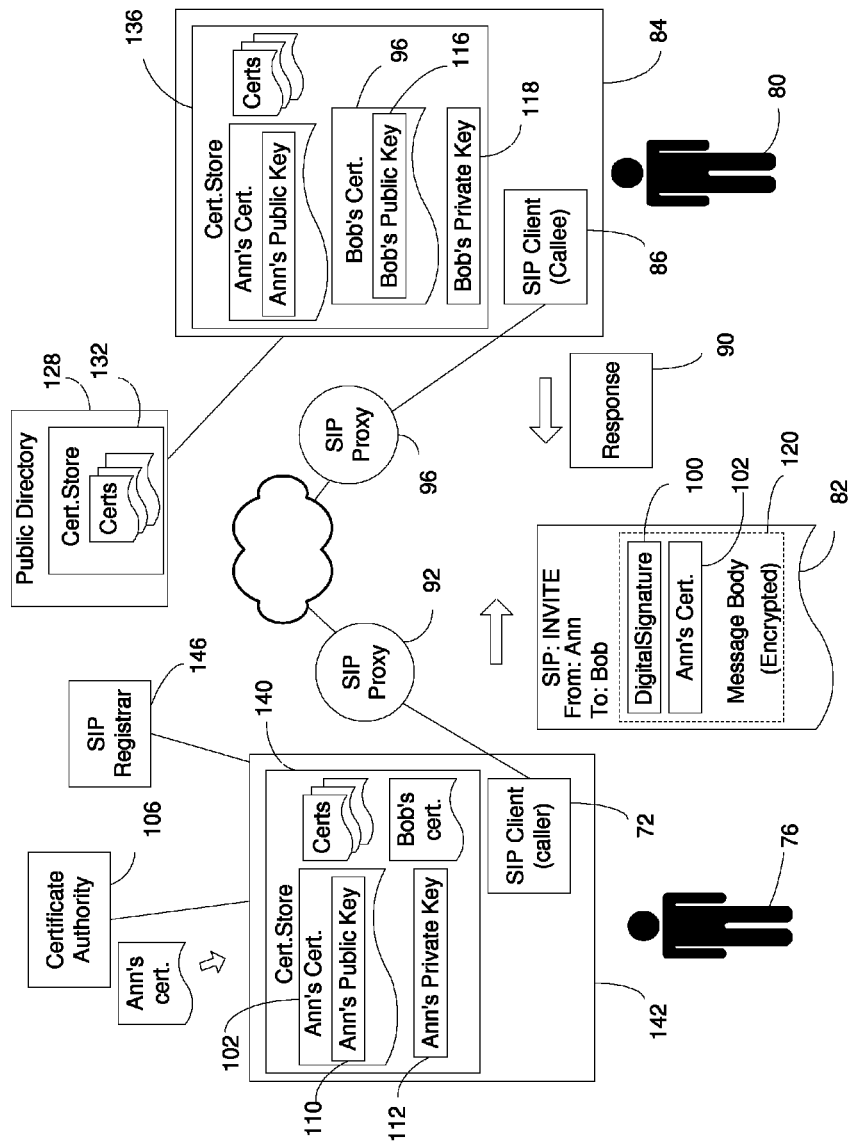
FIG. 2 is a schematic diagram illustrating two Session Initiation Protocol (SIP) clients that use a digital signature included in a SIP request message and the request sender's public-key certificate for end-to-end authentication.

Referring now to FIG. 2, the present invention is directed to a way to integrate an authentication mechanism into request and response messages under the Session Initiation Protocol (SIP) to enable end-to-end authentication. With the end-to-end authentication mechanism, a SIP node that receives a SIP request message from another SIP node can verify the identity of the user of the SIP node that sent the message, and vice versa. As used herein, the term "SIP node" means a SIP application running on a computing device, which may operate as a SIP client or a server.

By way of example, FIG. 2 shows an exemplary session initiation operation in which a user 76 (e.g., "Ann") of a SIP client 72 wants to initiate a communication session with another user 80 (e.g., "Bob"). To that end, the SIP client 72 sends an INVITE request message 82 that identifies Bob as the intended recipient for the INVITE request. In the context of communications under the SIP protocol, the SIP client 72 that sends the INVITE message 82 to initiate a session is referred to as the "caller," and the SIP client 86 on Bob's computer 84 that ultimately receives the INVITE message is referred to as the "callee." As defined in SIP, the SIP client 72 is also called a "user agent client" (UAC) as it creates a new request, and the SIP client 86 is also called a "user agent server" (UAS) as it generates a response 90 to a SIP request.

As shown in FIG. 2, the INVITE message 82 from Ann is sent to an outbound proxy server 92 for the caller SIP client's domain. Thereafter, the INVITE message may be passed through multiple SIP proxies involved in the signaling operation before it reaches the SIP proxy server 96 of Bob's domain. The SIP proxy 96 then forwards the INVITE message to the SIP client 86 (the "callee") of Bob's computer. Bob, however, may want to ensure that the INVITE message is really from Ann before accepting the call. In other words, the SIP client 86 has to first "authenticate" the user, in this case Ann, that sent the INVITE message.

In accordance with the invention, the end-to-end authentication between the sender and receiver of a SIP request is enabled by including in the SIP request message a digital signature of the sender, and using, by the SIP client receiving the request, a "public-key certificate" 102 of the sender to verify the digital signature, thereby authenticating the sender of the SIP request. The certificate-based end-to-end authentication may also be applied in the reverse direction for the SIP client 72 that sent the request 82 to authenticate the user 80 of the recipient SIP client 86. A public-key certificate (hereinafter abbreviated as "certificate") is a digitally signed statement from one entity saying that the public key of another entity (which can be a person, a computing device, or even an application) has some specific value. The certificate may also provide some other information about the owner of the public key. The entity that signs the certificate is called a Certificate Authority (CA). For instance, FIG. 2 shows a Certificate Authority 106 from which the user 76 of the sending SIP client obtains a public-key certificate 102. A widely used standard for certificates is the X.509 v.3 standard, which defines what information may go into a certificate and the data format for such information. The X.509 v.3 standard is described, for instance, in the Internet Engineering Task Force (IETF) Request for Comments (RFC) 2315, which is hereby incorporated by reference. An X.509 certificate includes, among other things, an Issuer Name (the name of the CA), a Subject Name (the name of the entity whose public key the certificate identifies), a Subject Public Key Information (which includes the public key of the entity), and a digital signature by the CA. In a preferred embodiment, the certificates used in the end-to-end authentication scheme according to the invention are X.509 certificates.

When the SIP client 72 sends the INVITE message 82, it includes in the message a digital signature 100 that is generated using a private key of the user. As shown in FIG. 2, the user Ann has a public key 110 and the associated private key 112. Likewise, the user Bob has a public key 116 and an associated private key 118. Typically, the process of generating the digital signature 100 involves generating a one-way hash (or digest) from selected portions of the SIP message, and encoding the hash with the private key 112 to produce the digital signature 100. Besides the digital signature, the SIP message 82 may also include a certificate 102 of the sender that contains the public key corresponding to the private key 112 used to generate the signature 100. Moreover, the SIP request message may be encrypted using a public key 116 of the intended recipient of the message (Bob in this example). Alternatively, the sender may encrypt the message with a session key, encrypt the session key with a public key of the intended recipient, sign the encrypted session key with her own private key, and include the session key in the SIP packet. The session key may be used only once for this session, or be established such that it can be used for a longer lifetime. It will be appreciated that although in the example of FIG. 2 the "SIP method" in the request message 82 is "INVITE," the certificate-based authentication scheme is equally applicable to the non-INVITE SIP requests.

When the callee SIP client 86 receives the SIP request message 82 containing the signature 100, it uses a certificate 102 of the sender associated with the private-public key pair of the sender to verify the digital signature 100 that came with the SIP request. Typically, the authentication process involves using the public key 110 of the sender 76 to decrypt the digital signature of the sender into a first hash value, generating a second hash value from those portions of the SIP message used by the sender to generate the digital signature, and comparing the two hash values. If they match, the recipient knows that the public key provided by the sender matches the private key used to generate the signature. If the request message includes a portion encrypted with the public key of the user 80, the SIP client 86 uses the private key 118 of the user to decrypt the encrypted data 120.

The matching of the hash values, however, only establishes that the message was signed with a private key that corresponds to the public key. The true identity of the owner of the public key is provided by the certificate 102. In other words, a match between the hash values indicates that the public key is associated with the private key used to generate the digital signature, and the certificate, if it can be believed, says who the owner of the public key is. If the owner of the public key 110 as identified by the certificate 102 is the sender of the SIP request message 82 as identified in the message, the SIP client (UAS) 86 has proven that the request is from the identified sender, i.e., the sender has been authenticated. The SIP client 86 can then decide to accept or reject the request.

Figure 3:
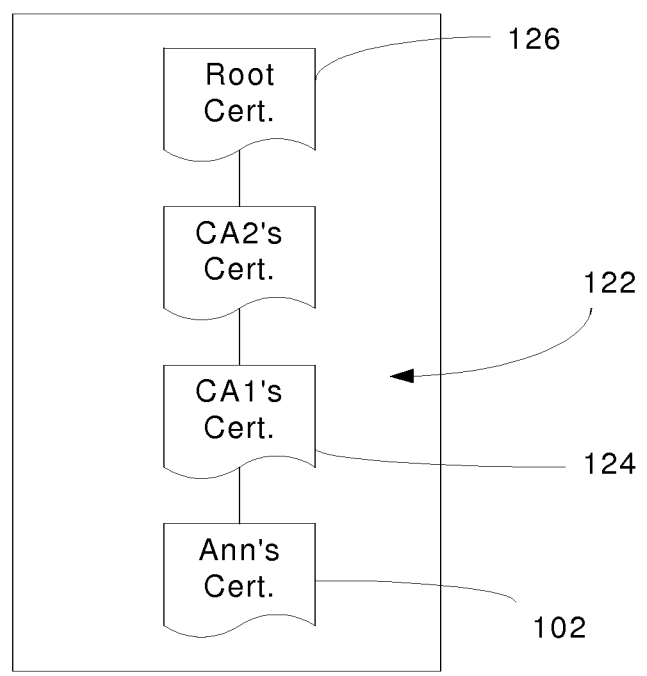
FIG. 3 is a schematic diagram showing a chain of certificates.

For the public-key authentication scheme to work, the receiver of the signed request has to trust the validity of the sender's certificate 102. In other words, the receiver has to know that the Certificate Authority (CA) 106 that signed the sender's certificate 102 is itself trustworthy. To that end, the CA's signature may be authenticated using a certificate 124 issued to the CA by a higher level CA. Thus, as shown in FIG. 3, the validation of a user's certificate 102 typically requires a chain of certificates, with a "root" certificate 126 at the top of the chain issued by a global root-level CA, such as Verisign or Thawte, etc. When the SIP client 86 receives the request message 82, it constructs a list 122 of those certificates in the certificate chain of the sender's certificate 102. It then obtains all the certificates in the list it needs for verifying the validity of the sender's certificate.

There are different ways for the SIP client 86 to obtain the sender's certificate and/or other certificates in the certificate chain required for verifying the validity of the sender's certificate. For instance, if the SIP message 82 includes a certificate 102 of the sender, the SIP client 86 extracts that certificate and uses it to authenticate the sender of the message. If, however, a certificate is not included in the SIP message 82, the SIP client 86 may obtain a certificate of the sender identified in the SIP request from a public directory 128 or other places on the network that publish certificates. As shown in FIG. 2, the public directory 128 maintains a certificate store 132 containing certificates issued to different users, and those certificates can be retrieved and sent to a SIP client upon request.

The computer 84 of the receiving SIP client 86 may also maintain a private certificate store 136 that maintains copies of certificates of different users that have been previously provided to or obtained by the computer. These certificates may include certificates of users of the machine 84 of the SIP client 86 as well as certificates of users of machines that the SIP client 86 has communicated with. In a preferred embodiment, when the SIP client 86 receives the request message 82, it first checks the local certificate store 136 to see whether the store contains a certificate of the sender or the other certificates in the certificate chain. It then builds a list of those certificates in the certificate chain that are not found in the certificate store, and tries to obtain those missing certificates from the public directory 128 or other sources.

In order to use the public-key cryptography scheme for authentication, the user 76 of the sending SIP client 72 has to first obtain a certificate for her public key. To that end, in one implementation, the user 72 first generates a random pair of public and private keys, and sends the public key 110 to the Certificate Authority 106. After confirming the user's identity and other information, the CA 106 signs the public key and other information with its own private key, and puts the digital signature in a certificate 102 and sends the certificate to the user. This certificate is then stored with the associated private key 112 in the certificate store 140 on the computer 142. The SIP client 72 may also register the certificate 102 with a SIP registrar 146, which may publish the certificate to other SIP registrars in the SIP network to allow retrieval of the certificate by other SIP clients. In this regard, if the certificate and private key are transported up as a PKCS#12 package (or another type of secured package), the registrar can hand out the same certificate of the user to multiple client machines that the user may use. This enables the user to use the same public/private key pair and the associated certificate regardless of which client machine she is using.

When the SIP client 72 needs to send a request message with a digital signature, it checks the certificate store 140 to see whether the store contains a certificate of the user 76. If none is found in the store, the SIP client 72 may prompt the user 76 to provide a certificate that she wants to use. Alternatively, if there are multiple certificates of the user in the certificate store, the SIP client may ask the user to select one to use. Generally, the "Subject Name" of the certificate 102 should correspond to the user's name or SIP address as in the "From" header of the SIP request 82. Also, the "key usage" property of the selected certificate should allow it to be used for "Digital Signature" and/or for "Key Encipherment" encryption It should be noted that this design does not limit the user to using a single key for both signing and encrypting. Rather, multiple certificates and key pairs may be used as long as the key certificate are properly identified for the verifying entity, which may be either the intended recipient of the signed packet or an intermediate SIP entity.

If the SIP request message 82 is to be encrypted, the SIP client 72 also needs the certificate 102 of the recipient so that the message can be encrypted using the public key 116 of the recipient, or the message can be encrypted with a session key and the session key encrypted with the public key of the recipient. The recipient's certificate is also needed if the recipient is required to sign the response 90 and other messages. To verify the recipient's digital signature, the SIP client 7 of the sender 76 may also have to obtain certificates in the recipient's certificate chain.

Figure 4:
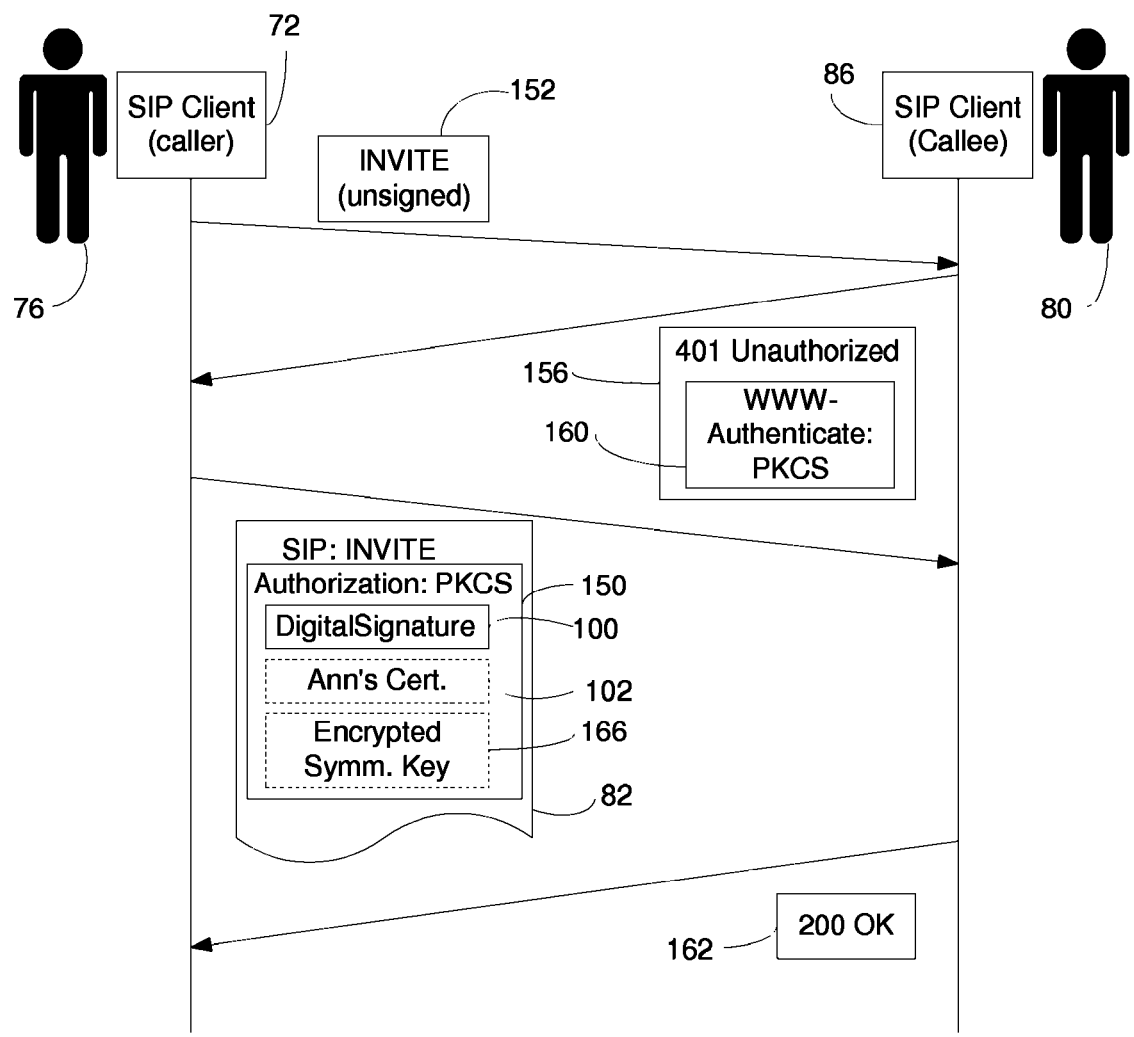
FIG. 4 is a schematic diagram showing a challenge-response sequence of SIP messages in which a SIP client sends a SIP request message with an Authorization header containing a digital signature for a receiving SIP client to authenticate the sender.

There are different ways to include digital signatures and certificates in the SIP request and response messages for end-to-end authentication. Referring now to FIG. 4, in one embodiment, the digital signature 100 is included in an Authorization header 150 of the SIP message 82 as defined in the SIP specification. The Authorization header 150 is of a newly defined type referred to herein as the Public Key Cryptography Standards (PKCS) type (mainly for the reason that the PKCS model is used for formatting the binary data).

The SIP request 82 with the digital signature 100 in the Authorization header 150 may be sent after receiving a challenge by the receiving SIP client to an initial request message. As illustrated in FIG. 4, the sending SIP client first sends an INVITE request message 152 without a signature. For simplicity and clarity of illustration, the intermediate SIP proxies are omitted from this diagram. When the SIP client 86 receives the unsigned INVITE message 152, it decides that authentication of the sender is required, and sends a code 401 response message 156 as defined by the SIP specification to challenge the sending SIP client 72 to provide data for authentication of the user 76.

The 401-challenge message includes a WWW-Authenticate header 160 in accordance with the SIP specification. This WWW-Authenticate header 160 is of a new type and is, like the Authenticate header mentioned above, hereinafter referred to as the PKCS type The fields in this header have the following syntax:

```
WWW-Authenticate  = "WWW-Authenticate" ":" "PKCS"
                    PKCS-challenge
PKCS-challenge    = 1# PKCS-params
PKCS-params       = (1# realm) | PKCS-micalgorithm |
PKCS-pubalgorithm | nonce | qop | PKCS-certificate
realm             = "realm" "=" realm-value
realm-value       = <"> token ";" *token <">
PKCS-micalgorithm = "algorithm" "=" ("md5" | "sha1" | token)
PKCS-pubalgorithm = "pubkey" "=" ("rsa" | "rsa-sign" | "dsa" | token)
qop               = "qop" "=" qop-value
qop-value         = "auth" | "auth-int" | "auth-conf"
PKCS-certificate  = "certificate" "=" quoted-string
nonce             = "nonce" "=" nonce-value
nonce-value       = quoted-string
```

In this header, the value of the qop ("quality of protection") field may be "auth" for authentication (singing (by the sender) only the digest without signing the headers following this header or the body), "auth-int" for authentication with integrity (signing data including following headers and the body), and "auth-conf" for authentication with confidentiality (auth-int plus encryption). For auth-conf, an encryption header is generated and the body is encrypted, and the encryption header and the encrypted body are signed across. The signature and related authentication data are then included in an Authentication header that is placed above the encrypted data. An example of the WWW-Authenticate header for PKCS is provided below.

WWW-Authenticate: PKCS nonce="913082051", qop="auth-int",
realm="jbuch1.redmond.corp.microsoft.com; intel.com; verisign.com"

In response to the 401 challenge 156, the SIP client 72 sends a second INVITE request 82 that includes a digital signature 100 contained in the Authorization header 150 of the SIP message. The syntax of the fields in this Authorization header 150 is as follows:

Authorization="Authorization" ":" "PKCS" #PKCS-response
PKCS-response=1# (PKCS-signature|nonce|nonce-count|qop)
nonce-count="nc" "=" nc-value
nc-value=quoted-string
qop="qop" "=" qop-value
qop-value="auth"|"auth-int"|"auth-conf"
PKCS-signature="signature" "=" quoted-string In particular, the PKCS-signature field provides the digital signature generated using the private key of the user 76. An example of the Authorization header is provided below.

Authorization: PKCS nonce="913082051", nc="00000001",
signature=7GhIGfH . . . g

In one implementation, the signature is a Base64 encoded signature of a message hash and is added after the hash is calculated from the message. The signature is computed, in order, across the nonce and nonce count (if present), request method, request version, and header fields following the Authorization header, and the message body. In this regard, headers in the SIP message are ordered so as to put all those headers excluded from the signature calculation before the Authorization header. Whether a header should be included in the signature or not may depend on whether it will be modified by the SIP proxy. For instance, headers that should or must be modified by the SIP proxy should not be included in the signature, while those headers that must not be modified by the SIP proxy should be included in the signature. The SIP request message may optionally include the certificate of the sender by using a "certificate" field or tag in the Authorization header 150.

Referring still to FIG. 4, when the SIP client 86 receives the second INVITE request 82 that contains the digital signature, it authenticates the sender by verifying the digital signature using the sender's certificate as described above. If the sender authentication is successful, the SIP client 86 sends a code 200 OK message 162 to the sending SIP client 72 to indicate that the request 82 is accepted.

As mentioned above, the sender may encrypt the SIP request message with the public key of the recipient. Alternatively, sender may encrypt the SIP request with a session key and encrypt the session key with the public key of the recipient. In one implementation, the encryption is indicated by using an "Encryption" header, the syntax of which is as follows:

Encryption = "Encryption" ":" "PKCS" PKCS-encoding EncryptionKey [ SessionKey ]
PKCS-encoding = "encoding" "=" ("base64" | token)
EncryptionKey = "encryption-key" "=" quoted-string
SessionKey = "session-key" "=" quoted-string The "EncryptionKey" field identifies the certificate for the public key of the recipient that the sender uses to encrypt the data, so that the recipient knows which private key to use for decryption in case they have more than one.

An example of an encryption header using this syntax is provided below.

Encryption: PKCS encoding=base64, encryption-key=J53vDe . . .

In many applications, SIP messaging is used to establish sessions in which a large amount of data, such as data for instant messaging or media streams, are to be transmitted in encrypted form. In such a case, it is not desirable to use the public keys of the communicating parties for data encryption because public key cryptographic calculation is slow and CPU intensive. Instead, a session key for symmetric encryption may be generated by either of the SIP clients for symmetric encryption of the data, which may be orders of magnitude faster than public key encryption. For instance, the SIP client 72 that sends the SIP request 82 may generate a symmetric key and encrypt it with the public key 116 of the recipient and include the encrypted key 166 as part of the Authorization header 150. Alternatively, the SIP client 86 of the recipient may include the encrypted symmetric key in the 200 OK response 162 to the SIP client 72. If a session key is used for data encryption, the "SessionKey" field in the Authorization header contains the encoded session key.

Figure 8:
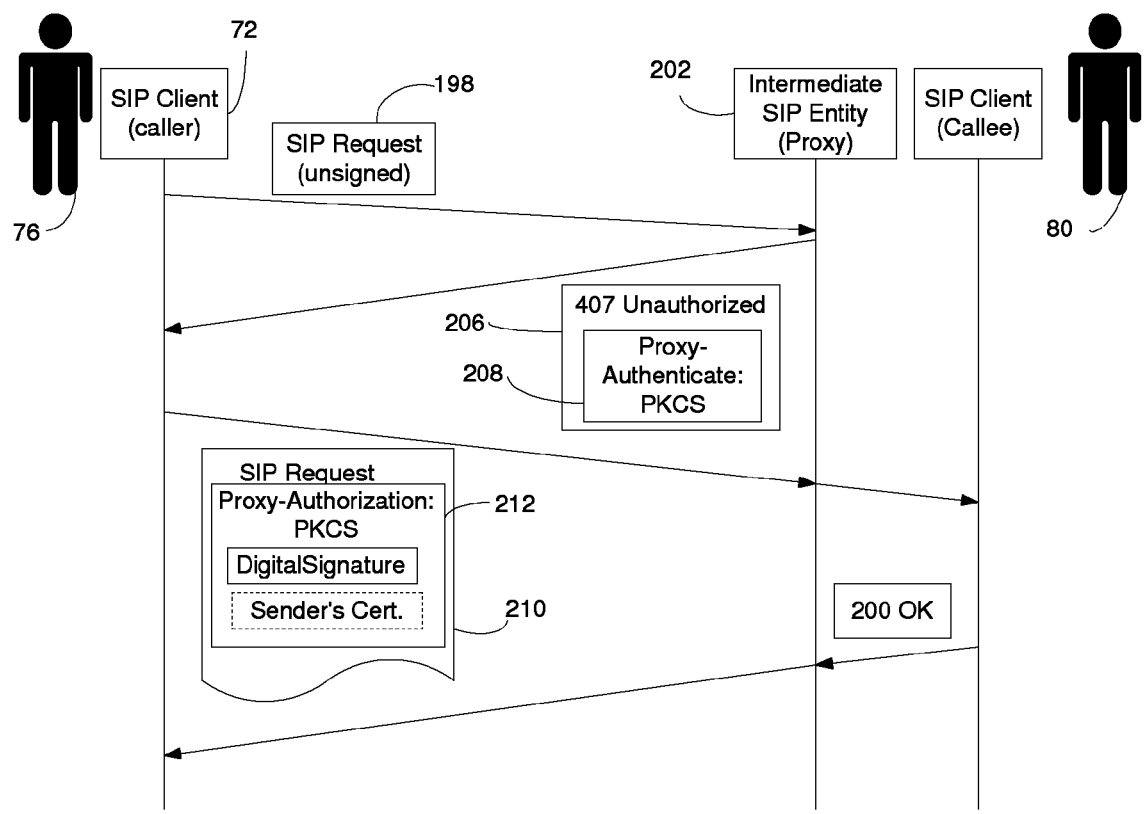
FIG. 8 is a schematic diagram illustrating challenge and authentication of a request sender between an intermediate entity working on the client's behalf and the sender.

It should be noted that the certificate-based authentication scheme for SIP in accordance with the invention can be used not only for the challenge and the authentication between an end SIP client the a request sender to an end SIP client, but also for the challenge and authentication of the request sender to between an intermediate entity (e.g., SIP proxy 96 of FIG. 2) working on a client's behalf and the sender. By way of example, referring now to FIG. 8, in one embodiment, in accordance with the SIP specification, when an intermediate SIP entity 202 receives an unsigned SIP request 198 and wants to challenges the sender 76 for authentication, it sends a "Code 407" challenge packet 206 (in accordance with the SIP specification) that includes a Proxy-Authenticate header 208 requesting certificate-based authentication. The fields of this Proxy-Authentication header, with the exception of the header title, have the same syntax as that of the WWW-Authenticate header described above. In respond to the 407 challenge, the sender sends a signed request 210 that contains a Proxy -Authorization header 212, which has the same syntax for its fields as the Authorization header described above.

Figure 5:
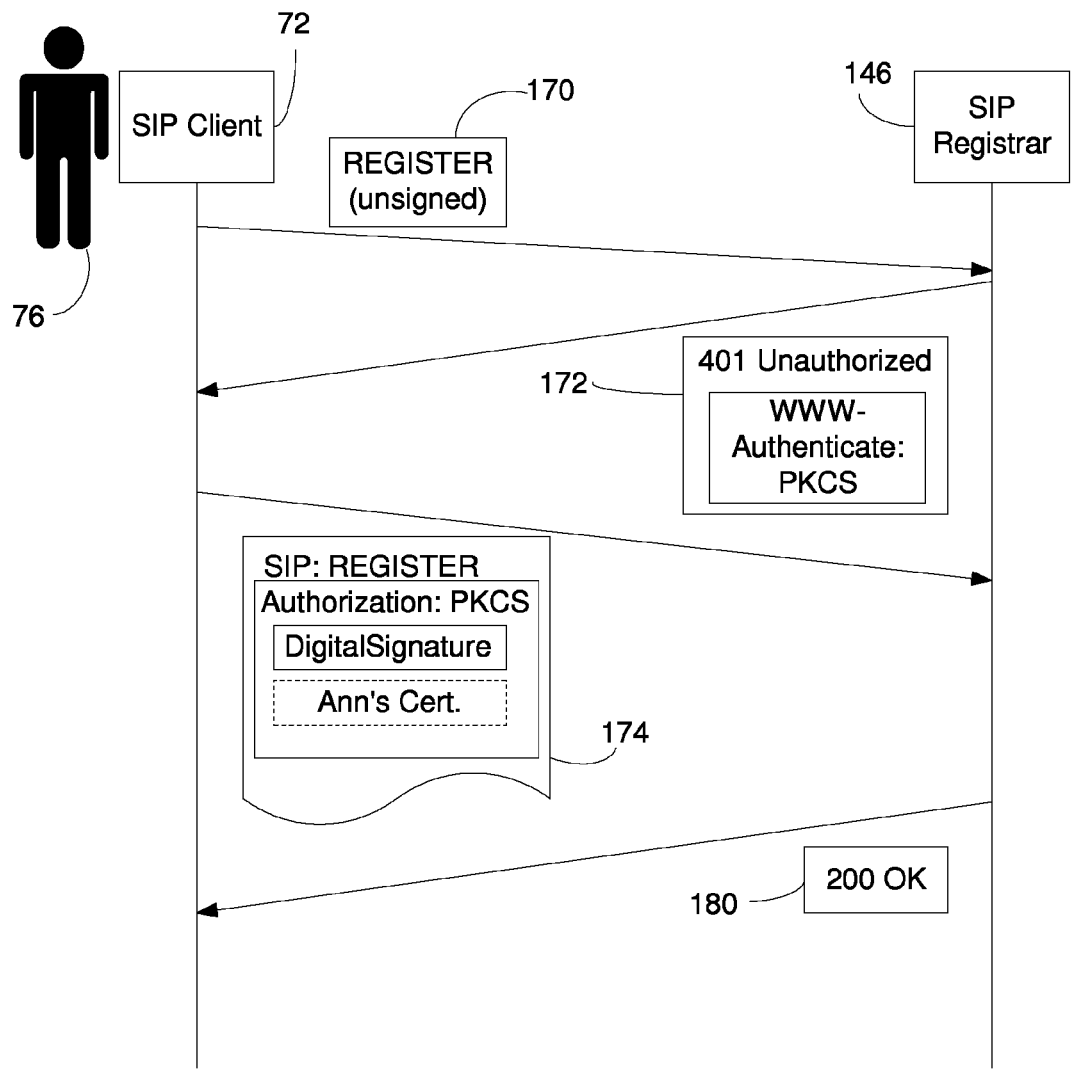
FIG. 5 is a schematic diagram showing a challenge-response sequence of SIP messages between a SIP client and a SIP registrar.

The response-challenge sequence described above may be used for requests other than the INVITE request. For instance, as shown in FIG. 5, it may be used when the SIP client 72 registers with a SIP registrar 146. The SIP client 72 first sends an unsigned REGISTER request 170 to the SIP registrar 146. The SIP registrar responds by sending a "Code 401" challenge message 172 with a WWW-Authenticate header to indicate to the SIP client that authentication using the public key scheme is required. The SIP client 72 then sends a second REGISTER request 174 with an Authorization header containing a digital signature to the SIP registrar 146. After authenticating the SIP client based on the digital signature, the SIP registrar returns a 200 OK message 180.

Figure 6:
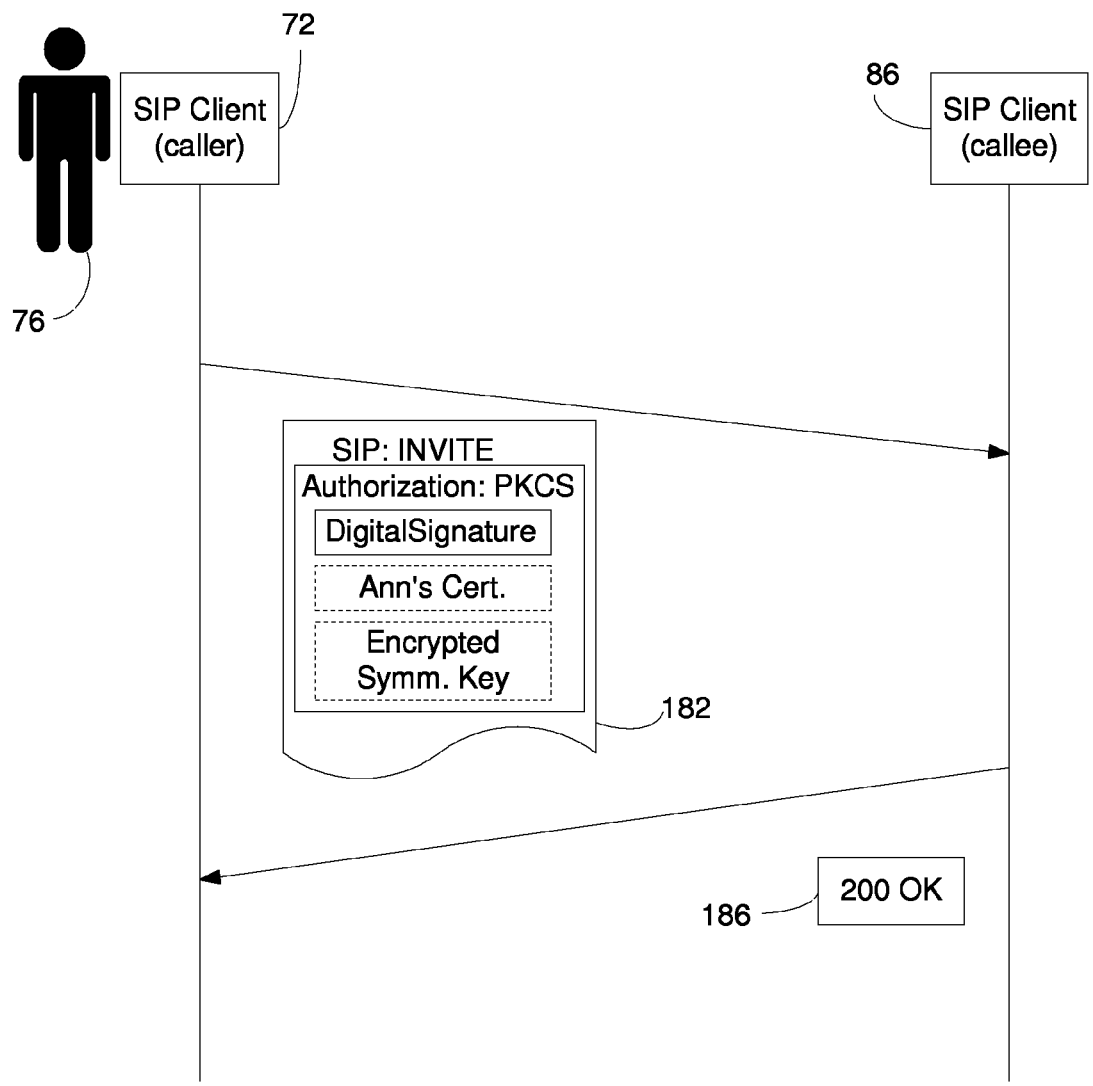
FIG. 6 is a schematic diagram showing a SIP client sending a SIP request message with a digital signature to a receiving SIP client.

Referring now to FIG. 6, instead of waiting to be challenged for authentication, the SIP client 72 may sign an initial SIP request 182 sent to the receiving SIP client 86. After receiving the request message, the SIP client 86 authenticates the sender of the request based on the digital signature in the message, and returns a 200 OK message 184 if the sender is successfully authenticated.

To illustrate the use of the PKCS Authorization header of a SIP request to carry a digital signature, several examples are provided below. In the first example, the SIP request is SUBSCRIBE, and a user with the SIP address of jbuch@microsoft.com subscribes to another user with the SIP address of roberbr@microsoft.com. The latter requires authentication, so a certificate challenge is made, and jbuch responds by sending the SUBSCRIBE message with a signature for authentication. The following shows the exemplary SIP messages involved in the exchange. For simplicity and clarity of illustration, the messages are simplified to show only stripped-down versions of the headers.

---

SUBSCRIBE roberbr3.ntdev.microsoft.com SIP/2.0
From: jbuch@microsoft.com
To: roberbr@microsoft.com
...
----------------
SIP/2.0 401 Unauthorized
From: jbuch@microsoft.com
To: roberbr@microsoft.com
...
WWW-Authenticate: PKCS nonce="234baa234089da324",
qop="auth-int",
    realm="microsoft.com; verisign.com",
...
----------------
SUBSCRIBE roberbr3.ntdev.microsoft.com SIP/2.0
...
Authorization: PKCS nonce="234baa234089da324", nc="00000001",
    signature="09bd4e5af8e90d..."
From: jbuch@microsoft.com
To: roberbr@microsoft.com
----------------
SIP/2.0 200 OK
From: jbuch@microsoft.com
To: roberbr@microsoft.com
...

---

In a second example, the SIP method is "MESSAGE," and a user dsimons@microsoft.com is sending a message to the user roberbr@microsoft.com, but roberbr requires authentication and sends a 401 challenge. The user dsimons then resends the MESSAGE request with a digital signature for authentication.

---

MESSAGE roberbr3.ntdev.microsoft.com SIP/2.0
From: dsimons@microsoft.com
To: roberbr@microsoft.com
...
Where do you want to go today?
----------------
SIP/2.0 401 Unauthorized
From: dsimons@microsoft.com
To: roberbr@microsoft.com
...
WWW-Authenticate: PKCS nonce="234baa234089da324",
qop="auth-int",
    realm="microsoft.com; verisign.com",
...
----------------
MESSAGE roberbr3.ntdev.microsoft.com SIP/2.0
...
Authorization: PKCS nonce="234baa234089da324", nc="00000001",
signature="09bd4e5af8e90d..."
From: dsimons@microsoft.com
To: roberbr@microsoft.com
Where do you want to go today?
----------------
SIP/2.0 200 OK
From: dsimons@microsoft.com
To: roberbr@microsoft.com
...

---

In yet another example, the user jbuch@microsoft.com sends another user vlade@microsoft.com an encrypted message that is encrypted using vlade's public key. In this example, the certificate for jbuch already has vlade's certificate, which may have been passed already with an earlier SIP signature or received from the network directory, etc.

---

MESSAGE vlade004.ntdev.microsoft.com SIP/2.0
From: jbuch@microsoft.com
To: vlade@microsoft.com
...
Encryption: PKCS encoding="base64",
    certificate="30818902818100d00eca85fb551a00d60729c28c2a0d3d
a3c7fa3568e5906f71f0f43dfbc6eb8042eda9085fc3d1d7b0c4c6d119d87f4
ea35009bfe708e71a251c2d2dd06f4eb8cef4ab6be140f138181c4847ff02fa
dbf33f20ccd3544e5ed8669ab4c08bb8addc8ef0576dfbd164031f2c67e9"
WC$TMOIWC$ACMKL:CAK:LACS__)ACO:A$C$CL:T$CJT
@#%$@#J#!$%#LM:FMJ:KLMIO^KL^DFMDF>)^GJD<FTL
DFJ$#^KL&)3jkl;4K$#K#5Krdkdgp03w45K#%jkeekl;j3etERT
----------------
SIP/2.0 200 OK
From: jbuch@microsoft.com
To: vlade@microsoft.com
...

---

Instead of using a SIP header, the digital signature may be carried in the message body of the SIP request. In one embodiment, the message body of the SIP message is constructed according to the Secure/Multipurpose Internet Mail Extensions (S/MIME) standard. The S/MIME standard is described in IETF RFC 2633 entitiled "S/MIME Version 3 Message Specification." It provides a method to send and receive secure MIME messages by using public-key certificates. The handling of certificates in connection with S/MIME is described in IETF RFC 2632 entitled "S/MIME Version 3 Certificate Handling." These RFCs are hereby incorporated by reference.

Figure 7:
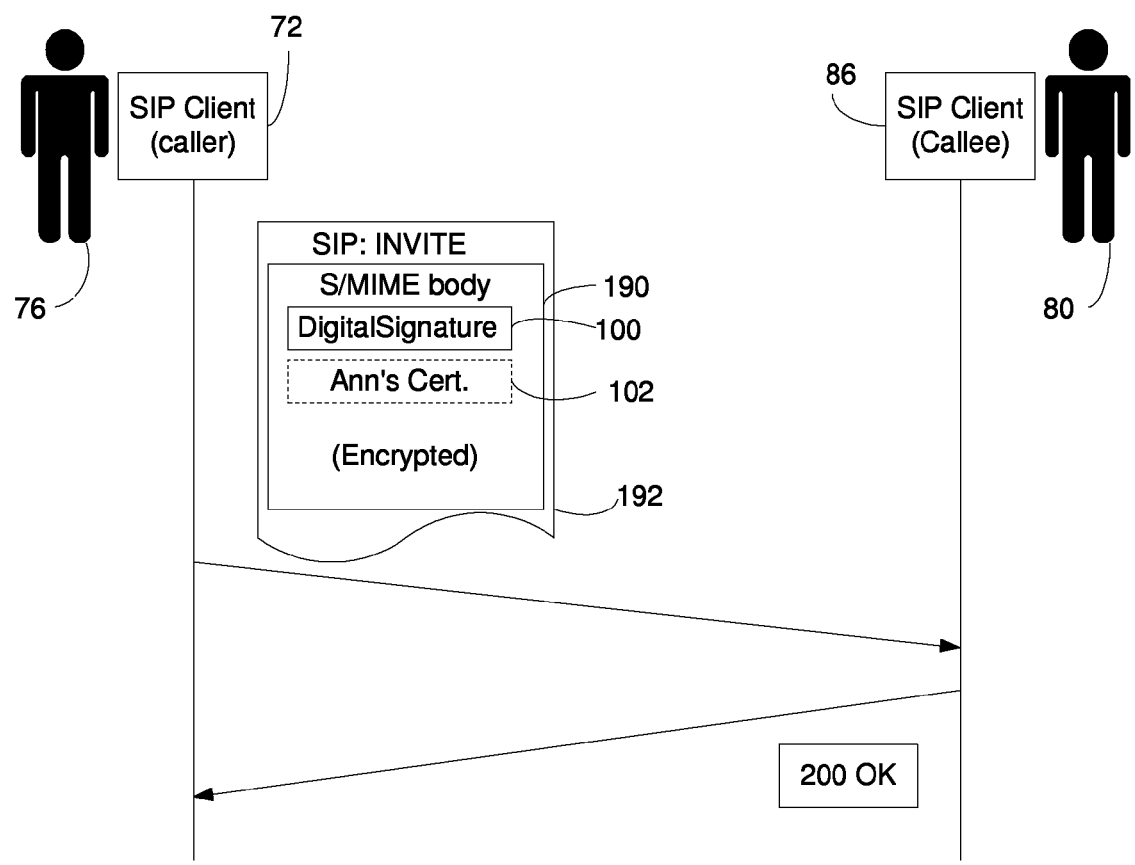
FIG. 7 is a schematic diagram showing a SIP client sending a SIP request having a S/MIME message body carrying a digital signature to a receiving SIP client.

As illustrated in FIG. 7, the S/MIME message body 190 of the SIP request message 192 includes a digital signal 200 generated using the user's private key and may optionally include a certificate 102 of the user. The S/MIME body 190 may also be encrypted. The sending SIP client 72 sends the SIP request message 192 containing the S/MIME message body 190 to the receiving SIP client 86. The receiving SIP client 86 retrieves the digital signature 200 from the message body and authenticates the sender based on the digital signature and the certificate of the sender. If the message body 192 is encrypted, the SIP client 86 uses the private key of the recipient to decrypt the encrypted data.

Generally, S/MIME messages are a combination of MIME bodies and Cryptographic Message Syntax (CMS) objects. The data to be secured is a canonical MIME entity. The MIME entity and other data, such as certificates and algorithm identifiers, are given to CMS processing facilities that produce a CMS object. The CMS object is then finally wrapped in MIME. The S/MIME standard defines two MIME types for signed messages: "application/pkcs7-mime" with signedData, and "multipart/signed." The application/pkcs7-mime type is used to carry CMS objects of several types including signedData and envelopedData. The multipart/signed format, on the other hand, is a clear-signing format that contains a plain MIME entity with a "detached signature." An S/MIME message body may include multiple blocks, each of which has a "content-type" identifying the MIME format of that block.

When the SIP message is to be signed, the signature covers at least the SIP method and version number, the "To" header, Call-ID, and Cseq. If the SIP message is to be encrypted, preferably all the fields that SIP proxies do not need to have access to are encrypted.

Several examples of SIP requests are provided below to illustrate the use of a S/MIME message body in a SIP request for carrying a digital signature and/or encrypted data. The first example uses the "multipart/signed" format, in which the regular SIP headers of the request are placed in a text/plain MIME entity, and the digital signature is in a separate part of message body.

---

REGISTER sip:microsoft.com SIP/2.0
Via: SIP/2.0/UDP amun1.ntdev.microsoft.com
MIME-Version: 1.0
Content-Type: application/pkcs7-mime; micalg=sha1;
    boundary="----=_NextPart_000_0003_01C0F8A6.B926A0F0"
Expires: 900
Authorization: SMIME
From: sip:jbuch@microsoft.com
To: sip:roberbr@microsoft.com
Call-ID: 09812389@microsoft.com
CSeq: 1 REGISTER
Contact: sip:jbuch@ 157.59.135.51:5060
------=_NextPart_000_0003_01C0F8A6.B926A0F0
Content-Type: application/pkcs7-mime;
smime-type=enveloped-data; name=smime.p7m
Content-Transfer-Encoding: base64
Content-Disposition: attachment; filename=smime.p7m
ghyHhHUujhJhjH77n8HHGTrfvbnj756tbB9HG4VQpfyF467GhIGfHfYT6
4VQpfyF467GhIGfHfYT6jH77n8HHGghyHhHUujhJh756tbB9HGTrfvbnj
n8HHGTrfvhJhjH776tbB9HG4VQbnj7567GhIGfHfYT6ghyHhHUujpfyF4
7GhIGfHfYT64VQbnj756------=_NextPart_000_0003_01C0F8A6.-
B926A0F0--

---

In a second example, the application/pkcs7-mime format is used to carry the digital signature.

---

REGISTER sip:microsoft.com SIP/2.0
Via: SIP/2.0/UDP amun1.ntdev.microsoft.com
MIME-Version: 1.0
Content-Type: application/pkcs7-mime; micalg=sha1;
    boundary="----=_NextPart_000_0003_01C0F8A6.B926A0F0"
Expires: 900
Authorization: SMIME
From: sip:jbuch@microsoft.com
To: sip:roberbr@microsoft.com
Call-ID: 09812389@microsoft.com
CSeq: 1 REGISTER
Contact: sip:jbuch@ 157.59.135.51:5060
------=_NextPart_000_0003_01C0F8A6.B926A0F0
Content-Type: application/pkcs7-mime;
    smime-type=enveloped-data; name=smime.p7m
Content-Transfer-Encoding: base64
Content-Disposition: attachment; filename=smime.p7m
ghyHhHUujhJhjH77n8HHGTrfvbnj756tbB9HG4VQpfyF467GhIGfHfYT6
4VQpfyF467GhIGfHfYT6jH77n8HHGghyHhHUujhJh756tbB9HGTrfvbnj
n8HHGTrfvhJhjH776tbB9HG4VQbnj7567GhIGfHfYT6ghyHhHUujpfyF4
7GhIGfHfYT64VQbnj756------=_NextPart_000_0003_01C0F8A6.-
B926A0F0--

---

The third example of SIP with S/MIME illustrates a SIP request with encryption. The "multipart/encrypted" format is used to carry the encrypted data.

---

MESSAGE sip:microsoft.com SIP/2.0
Via: SIP/2.0/UDP amun1.ntdev.microsoft.com
From: sip:jbuch@microsoft.com
To: sip:roberbr@microsoft.com
Call-ID: 09810929@microsoft.com
CSeq: 1 MESSAGE
MIME-Version: 1.0
Content-Type: multipart/encrypted; protocol="TYPE??/STYPE??";
    boundary="----=_NextPart_000_0003_01C0F8A6.B926A0F0"
Authorization: SMIME
------=_NextPart_000_0003_01C0F8A6.B926A0F0
Content-Type: TYPE??/STYPE??
------=_NextPart_000_0003_01C0F8A6.B926A0F0
Content-Type: application/octet-stream
Content-Type: text/plain; charset="us-ascii"
ghyHhHUujhJhjH77n8HHGTrfvbnj756tbB9HG4VQpfyF467GhIGfHfYT6
4VQpfyF467GhIGfHfYT6jH77n8HHGghyHhHUujhJh756tbB9HGTrfvbnj
n8HHGTrfvhJhjH776tbB9HG4VQbnj7567GhIGfHfYT6ghyHhHUujpfyF4
7GhIGfHfYT64VQbnj756
------=_NextPart_000_0003_01C0F8A6.B926A0F0--

---

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A sending device for participating in a communications session with a receiving device, comprising:
    a memory storing computer-executable instructions of:
    a component that encrypts information using a public key of the receiving device, the information including a symmetric key and content other than the symmetric key;
    a component that signs the encrypted information using a private key of the sending device;
    a component that adds the signed encrypted information to an invite message that invites the receiving device to participate in the communications session;
    a component that sends to the receiving device the message with the signed encrypted information;
    a component that receives a response from the receiving device indicating that the receiving device is accepting the invitation to participate in the communications session with the sending device based on the receiving device having verified using a public key of the sending device that the sending device signed the signed encrypted information; and
    a component that conducts the communications session with the receiving device using the symmetric key to:
    encrypt messages to be sent to the receiving device and decrypt messages received from the receiving device that were encrypted by the receiving device using the symmetric key that was decrypted by the receiving device using a private key of the receiving device; and
    a processor that executes the computer-executable instructions stored in the memory.

2. The sending device of claim 1 wherein the message with the signed encrypted information is part of a dialog of a protocol for establishing a session.

3. The sending device of claim 1 wherein the message with the signed encrypted information is an invite message inviting the receiving device to participate in the session.

4. The sending device of claim 1 including a component that, in response to receiving a challenge from the receiving device, directs the sending of the message with the signed encrypted information to the receiving device.

5. The sending device of claim 1 wherein the message with the signed encrypted information is sent using the Session Initiation Protocol.

6. The sending device of claim 1 wherein the content other than the symmetric key includes a public key certificate of the sending device.

7. The sending device of claim 1 wherein the component that signs the encrypted information generates a hash value of the information and encrypts the hash value using the private key of the sending device.

8. The sending device of claim 1 wherein the message with the signed encrypted information is sent via a first communications network and the communications session is conducted via a second communications network.

9. A receiving device for participating in a communications session with a sending device, comprising:
 a memory storing computer-executable instructions of:
  a component that receives an invite message from the sending device to participate in the communications session, the message including signed encrypted information, the encrypted information including a symmetric key encrypted using a public key of the receiving device, the encrypted information being signed using a private key of the sending device;
  a component that verifies using a public key of the sending device that the sending device signed the encrypted information and responds to the sending device indicating that the receiving device is accepting the invitation to participate in the communications session with the sending device based on the successful verification;
  a component that decrypts the encrypted information using a private key of the receiving device and extracts the symmetric key; and a component that conducts the communications session with the sending device using the symmetric key to:
   encrypt messages to be sent to the sending device and decrypt messages received from the sending device that were encrypted using the symmetric key; and
  a processor that executes the computer-executable instructions stored in the memory.

10. The receiving device of claim 9 wherein the message with the signed encrypted information is part of a dialog of a protocol for establishing a session.

11. The receiving device of claim 9 wherein the message with the signed encrypted information is an invite message inviting the receiving device to participate in the session.

12. The receiving device of claim 9 including a component that sends a challenge to the sending device wherein the message with the signed encrypted information is a response to the challenge.

13. The receiving device of claim 9 wherein the message with the signed encrypted information is sent using the Session Initiation Protocol.

14. The receiving device of claim 9 wherein the received message with the signed encrypted information includes a public key certificate of the sending device.

15. The receiving device of claim 9 wherein the component that verifies decrypts a hash value of the message with the signed encrypted information, generates a hash value for the encrypted information, and compares the decrypted hash value to the generated hash value.

16. A computer-readable storage device containing instructions for controlling a sending device to initiate a communications session with a receiving device, comprising:
 instructions that encrypt information using a public key of the receiving device, the information including a symmetric key;
 instructions that sign the encrypted information using a private key of the sending device;
 instructions that sends to the receiving device an invite message inviting the receiving device to participate in the communications session, the invite message including the signed encrypted information; and
 instructions that receive a response from the receiving device indicating that the receiving device is accepting the invitation to participate in the communications session with the sending device based on the receiving device having verified using the public key of the sending device that the sending device signed the encrypted information of the invite message; and
 instructions to conduct the communications session with the receiving device using the symmetric key to:
  encrypt messages to be sent to the receiving device and
  decrypt messages received from the receiving device that were encrypted by the receiving device using the symmetric key that was decrypted by the receiving device using a private key of the receiving device.

17. The computer-readable storage device of claim 16 including instructions that conduct the communications session with the receiving device using the symmetric key to:
 encrypt messages to be sent to the receiving device and
 decrypt messages received from the receiving device that were encrypted using the symmetric key that was decrypted by the receiving device using a private key of the receiving device.

18. The computer-readable storage device of claim 16 wherein the invite message is sent using the Session Initiation Protocol.

19. The computer-readable storage device of claim 16 wherein the invite message includes a public key certificate of the sending device.

20. The computer-readable storage device of claim 16 wherein the instructions that sign generates a hash value of information and encrypts the hash value using the private key of the sending device.

* * * * *